United States Patent
Huang et al.

(10) Patent No.: US 8,854,018 B2
(45) Date of Patent: Oct. 7, 2014

(54) CONTROL CIRCUIT FOR REDUCING TOUCH CURRENT OF A POWER CONVERTER AND OPERATION METHOD THEREOF

(71) Applicant: Leadtrend Technology Corp., Hsin-Chu (TW)

(72) Inventors: Kuo-Chien Huang, Hsin-Chu (TW); Chen-Lun Yang, Hsin-Chu (TW); Hsin-Hung Lu, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/789,651

(22) Filed: Mar. 7, 2013

(65) Prior Publication Data

US 2013/0250620 A1 Sep. 26, 2013

Related U.S. Application Data

(60) Provisional application No. 61/612,985, filed on Mar. 20, 2012.

(51) Int. Cl.
*G05F 5/00* (2006.01)
*H02M 1/42* (2007.01)
*H02M 3/24* (2006.01)
*H02M 1/00* (2006.01)

(52) U.S. Cl.
CPC *H02M 3/24* (2013.01); *Y02B 70/16* (2013.01); *H02M 1/4225* (2013.01); *Y02B 70/126* (2013.01); *H02M 2001/0035* (2013.01)

USPC .......................... 323/207; 323/222; 363/89

(58) Field of Classification Search
USPC .......... 323/205, 207, 222; 363/15, 16, 84, 89, 363/90
See application file for complete search history.

(56) References Cited

U.S. PATENT DOCUMENTS

| | | | | |
|---|---|---|---|---|
| 5,003,454 | A | * | 3/1991 | Bruning .......................... 363/81 |
| 7,397,678 | B2 | * | 7/2008 | Frank et al. ..................... 363/89 |
| 2010/0165683 | A1 | * | 7/2010 | Sugawara ....................... 363/126 |

* cited by examiner

*Primary Examiner* — Nguyen Tran
(74) *Attorney, Agent, or Firm* — Winston Hsu; Scott Margo

(57) ABSTRACT

A control circuit for reducing touch current of a power converter includes an auxiliary pin, a zero-crossing signal generator, a feedback pin, a frequency limiting signal generator, and a gate signal generator. The auxiliary pin receives a voltage corresponding to an auxiliary winding of the power converter. The zero-crossing signal generator generates a zero-crossing signal according to the voltage and a first reference voltage. The feedback pin receives a feedback voltage corresponding to an output voltage of the power converter. The frequency limiting signal generator generates a frequency limiting signal according to the feedback voltage and a second reference voltage. The frequency limiting signal limits the gate control signal to a predetermined frequency. The gate signal generator generates a gate control signal to a power switch of the power converter according to the frequency limiting signal and the zero-crossing signal.

18 Claims, 6 Drawing Sheets

CONTROL CIRCUIT FOR REDUCING TOUCH CURRENT OF A POWER CONVERTER AND OPERATION METHOD THEREOF

CROSS REFERENCE TO RELATED APPLICATIONS

This application claims the benefit of U.S. Provisional Application No. 61/612,985, filed on Mar. 20, 2012 and entitled "Touch current solution," the contents of which are incorporated herein by reference.

BACKGROUND OF THE INVENTION

1. Field of the Invention

The present invention relates to a control circuit for reducing touch current of a power converter and an operation method thereof, and particularly to a control circuit and an operation method thereof that can reduce touch current generated by a quick decrease voltage of an input capacitor of a power converter when the power converter leaves a burst mode.

2. Description of the Prior Art

In the prior art, when a power converter with power factor correction (PFC) is in operation of a high output voltage and a light load, the power converter can enters a burst mode. After the power converter enters the burst mode, a power switch of the power converter can be switched according to a gate control signal corresponding to the burst mode. Meanwhile, because power consumption of the power converter is very small, an input capacitor of the power converter can be maintained at a voltage when the power switch stops being switched. When the power converter leaves the burst mode, the power switch starts to be switched according to the gate control signal corresponding to a quasi resonant mode. Meanwhile, if an input voltage is less than the voltage of the input capacitor, diodes of a bridge rectifier of the power converter would be turned off, resulting in the input capacitor providing power to an inductor of the power converter. Thus, the voltage of the input capacitor is decreased. Meanwhile, the voltage of the input capacitor is quickly decreased because the power converter is operated on the highest frequency thereof, resulting in a touch current of the power converter exceeds a safety specification.

In addition, the prior art can only adjust parameters of the power converter to solve a problem of larger touch current, so the prior art can only solve the problem of larger touch current partially. Therefore, a designer of the power converter needs to find a new solution to substitute for the prior art.

SUMMARY OF THE INVENTION

An embodiment provides a control circuit for reducing touch current of a power converter, where the power converter is a power converter with power factor correction. The control circuit includes an auxiliary pin, a zero-crossing signal generator, a feedback pin, a frequency limiting signal generator, and a gate signal generator. The auxiliary pin is used for receiving a voltage corresponding to an auxiliary winding of the power converter. The zero-crossing signal generator is used for generating a zero-crossing signal according to the voltage and a first reference voltage. The feedback pin is used is used for receiving a feedback voltage corresponding to an output voltage of the power converter. The frequency limiting signal generator is used for generating a frequency limiting signal according to the feedback voltage and a second reference voltage. The gate signal generator is used for generating a gate control signal to a power switch of the power converter according to the zero-crossing signal and the frequency limiting signal.

Another embodiment provides an operation method for reducing touch current of a power converter. The operation method includes receiving a voltage corresponding to an auxiliary winding of the power converter; generating a zero-crossing signal according to the voltage and a first reference voltage; receiving a feedback voltage corresponding to an output voltage of the power converter; generating a compensation voltage according to the feedback voltage and a third reference voltage; and generating a gate control signal to a power switch of the power converter according to a combination composed of the zero-crossing signal, the compensation voltage, a second reference voltage, and a burst mode reference voltage; where the burst mode reference voltage is less than the second reference voltage, and a frequency of the gate control signal is varied with the compensation voltage between the burst mode reference voltage and the second reference voltage.

The present invention provides a control circuit for reducing touch current of a power converter and an operation method thereof. The control circuit and the operation method utilize a frequency limiting signal generator to generate a frequency limiting signal according to a feedback voltage and a second reference voltage when the power converter leaves a burst mode to make a frequency of a gate control signal be varied with a compensation voltage between a burst mode reference voltage and the second reference voltage. When the frequency limiting signal generator does not generate the frequency limiting signal, a gate signal generator can generate the gate control signal corresponding to a quasi resonant mode according to a zero-crossing signal. Thus, compared to the prior art, because the frequencies of the gate control signals corresponding to two terminals of a touch current reduction mode are different, the present invention can slowly decrease a voltage of an input capacitor of the power converter to reduce a touch current when the power converter leaves the burst mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
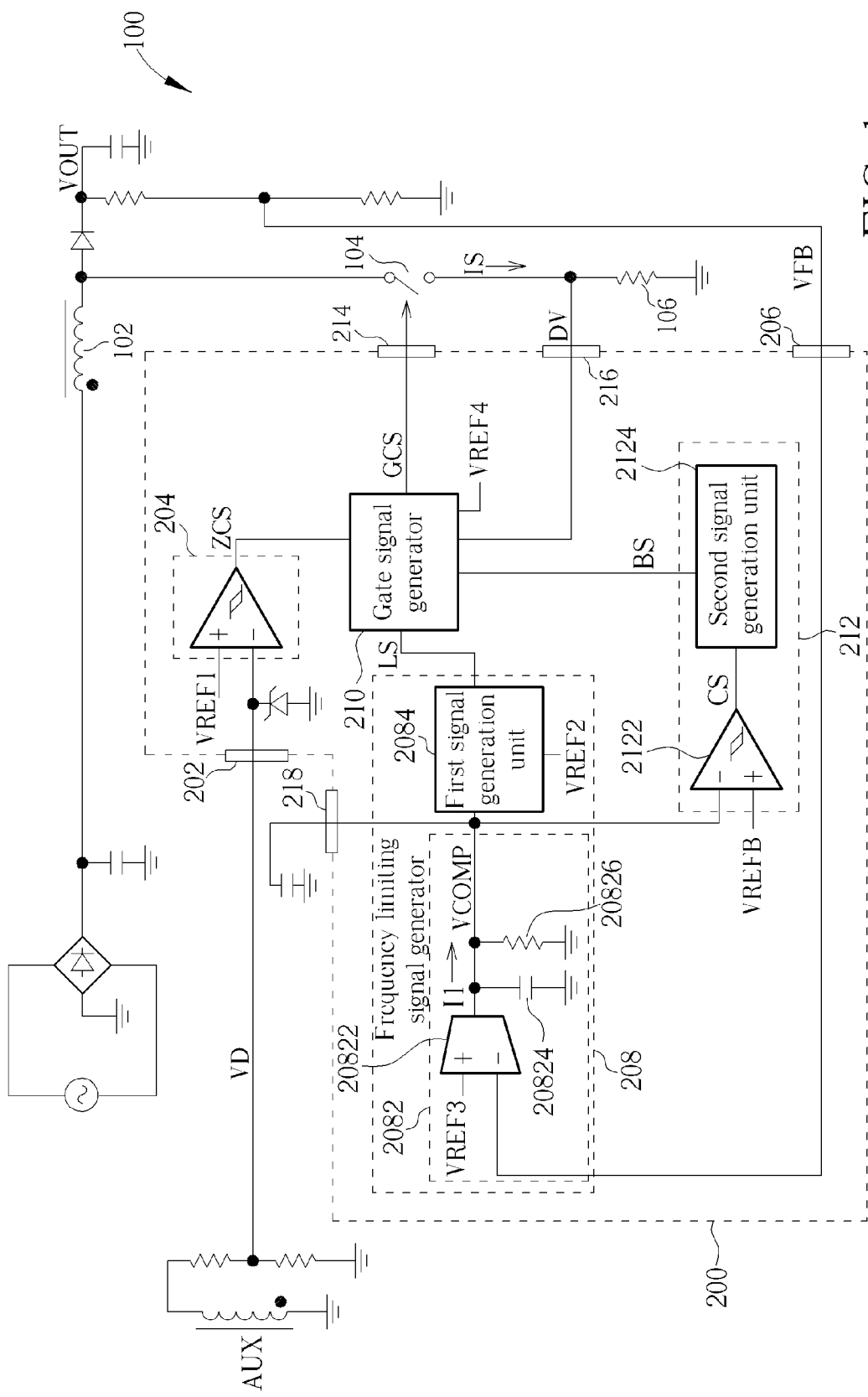
FIG. 1 is a diagram illustrating a control circuit for reducing touch current of a power converter according to an embodiment.

Please refer to FIG. 1. FIG. 1 is a diagram illustrating a control circuit 200 for reducing touch current of a power converter 100 according to an embodiment, where the power converter 100 is a power converter with power factor correction (PFC), and also a boost power converter. The control circuit 200 includes an auxiliary pin 202, a zero-crossing signal generator 204, a feedback pin 206, a frequency limiting signal generator 208, and a gate signal generator 210, where the auxiliary pin 202 is used for receiving a voltage VD corresponding to an auxiliary winding AUX of the power converter 100. The zero-crossing signal generator 204 is used for generating a zero-crossing signal ZCS according to the voltage VD and a first reference voltage VREF1, where the first reference voltage VREF1 is about 0.2V to 0.3V. That is to say, when the voltage VD is less than the first reference voltage VREF1, the zero-crossing signal generator 204 generates the zero-crossing signal ZCS. As shown in FIG. 1, the zero-crossing signal generator 204 is a hysteresis comparator. But, the present invention is not limited to the zero-crossing signal generator 204 being a hysteresis comparator. The feedback pin 206 is used for receiving a feedback voltage VFB corresponding to an output voltage VOUT of the power converter 100, where the feedback voltage VFB corresponds to a load of the power converter 100. That is to say, the feedback voltage VFB can be varied with the load of the power converter 100. The frequency limiting signal generator 208 is used for generating a frequency limiting signal LS according to the feedback voltage VFB and a second reference voltage VREF2. As shown in FIG. 1, the control circuit 200 further includes a burst mode signal generation module 212, a gate pin 214 and a current pin 216. In addition, as shown in FIG. 1, an induction direction of the auxiliary winding AUX and an induction direction of an inductor 102 coupled to the power converter 100 are inverse each other.

Figure 2:
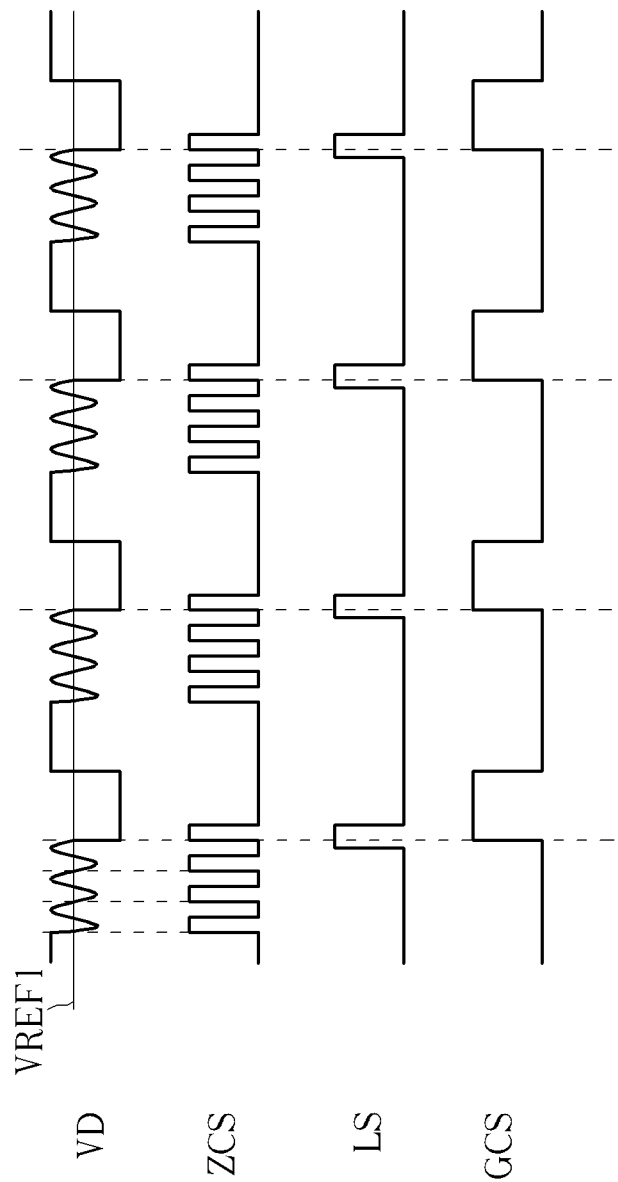
FIG. 2 is a diagram illustrating the gate signal generator generating the gate control signal corresponding to a touch current reduction mode according to the zero-crossing signal and the frequency limiting signal.

As shown in FIG. 1, the frequency limiting signal generator 208 includes a compensation voltage generation unit 2082 and a first signal generation unit 2084. The compensation voltage generation unit 2082 is used for generating a compensation voltage VCOMP according to the feedback voltage VFB and a third reference voltage VREF3. The compensation voltage generation unit 2082 includes a transconductance amplifier 20822, a first resistor 20824, and a first capacitor 20826. The transconductance amplifier 20822 is used for generating a first current I1 according to the feedback voltage VFB and the third reference voltage VREF3. The first resistor 20824 and the first capacitor 20826 are used for generating the compensation voltage VCOMP according to the first current I1. In addition, the compensation voltage generation unit 2082 shown in FIG. 1 is only used for describing the control circuit 200, that is, the present invention is not limited to the compensation voltage generation unit 2082 shown in FIG. 1. In addition, the power converter 100 further includes a compensation pin 218 which is coupled to an output terminal of the compensation voltage generation unit 2082. The first signal generation unit 2084 is used for generating the frequency limiting signal LS when the compensation voltage VCOMP is less than the second reference voltage VREF2. When the compensation voltage VCOMP is less than the second reference voltage VREF2, the frequency limiting signal generator 208 generates the frequency limiting signal LS to the gate signal generator 210. Please refer to FIG. 2. FIG. 2 is a diagram illustrating the gate signal generator 210 generating the gate control signal GCS corresponding to a touch current reduction mode according to the zero-crossing signal ZCS and the frequency limiting signal LS. As shown in FIG. 2, when the gate signal generator 210 receives the zero-crossing signal ZCS and the frequency limiting signal LS, the gate signal generator 210 can generate the gate control signal GCS corresponding to the touch current reduction mode according to the zero-crossing signal ZCS and the frequency limiting signal LS, and the gate control signal GCS can be transmitted to a power switch 104 of the power converter 100 through the gate pin 214. Then, the power switch 104 can be turned on according to the gate control signal GCS corresponding to the touch current reduction mode.

As shown in FIG. 1, the burst mode signal generation module 212 includes a first comparator 2122 and a second signal generation unit 2124. The first comparator 2122 is used for generating a comparison signal CS according to the compensation voltage VCOMP and a burst mode reference voltage VREFB. That is to say, when the compensation voltage VCOMP is less than the burst mode reference voltage VREFB, the first comparator 2122 generates the comparison signal CS, where the burst mode reference voltage VREFB is less than the second reference voltage VREF2. When the second signal generation unit 2124 receives the comparison signal CS, the second signal generation unit 2124 can generate a burst mode signal BS to the gate signal generator 210 (that is, the power converter 100 enters a burst mode) according to the comparison signal CS. When the gate signal generator 210 receives the burst mode signal BS, the gate signal generator 210 can generate the gate control signal GCS corresponding to the burst mode according to the burst mode signal BS and the zero-crossing signal ZCS, and the gate control signal GCS can be transmitted to the power switch 104 of the power converter 100 through the gate pin 214. The power switch 104 can be turned on according to the gate control signal GCS corresponding to the touch current reduction mode.

Figure 3:
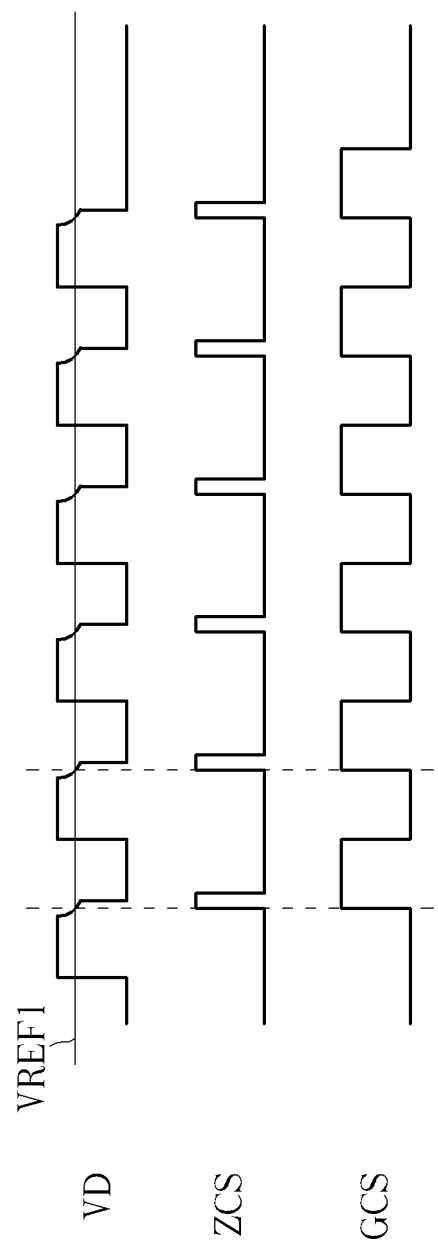
FIG. 3 is a diagram illustrating the gate signal generator generating the gate control signal corresponding to a quasi resonant mode according to the zero-crossing signal.

Please refer to FIG. 3. FIG. 3 is a diagram illustrating the gate signal generator 210 generating the gate control signal GCS corresponding to a quasi resonant mode according to the zero-crossing signal ZCS. As shown in FIG. 3, when the compensation voltage VCOMP is greater than the second reference voltage VREF2 (that is, the frequency limiting signal generator 208 does not generate the frequency limiting signal LS, and the power converter 100 enters the quasi resonant mode), the gate signal generator 210 can generate the gate control signal GCS corresponding to the quasi resonant mode according to the zero-crossing signal ZCS generated by the zero-crossing signal generator 204, and the gate control signal GCS can be transmitted to the power switch 104 of the power converter 100 through the gate pin 214. Then, the power switch 104 can be turned on according to the gate control signal GCS corresponding to the quasi resonant mode.

In addition, as shown in FIG. 1, the current pin 216 is used for receiving a detection voltage DV determined according to a current IS flowing through the power switch 104 and a resistor 106. The gate signal generator 210 is further used for disabling the gate control signal GCS according to the detection voltage DV and a fourth reference voltage VREF4, that is, when the detection voltage DV is greater than the fourth reference voltage VREF4, the gate signal generator 210 disables the gate control signal GCS to turn off the power switch 104.

Figure 4:
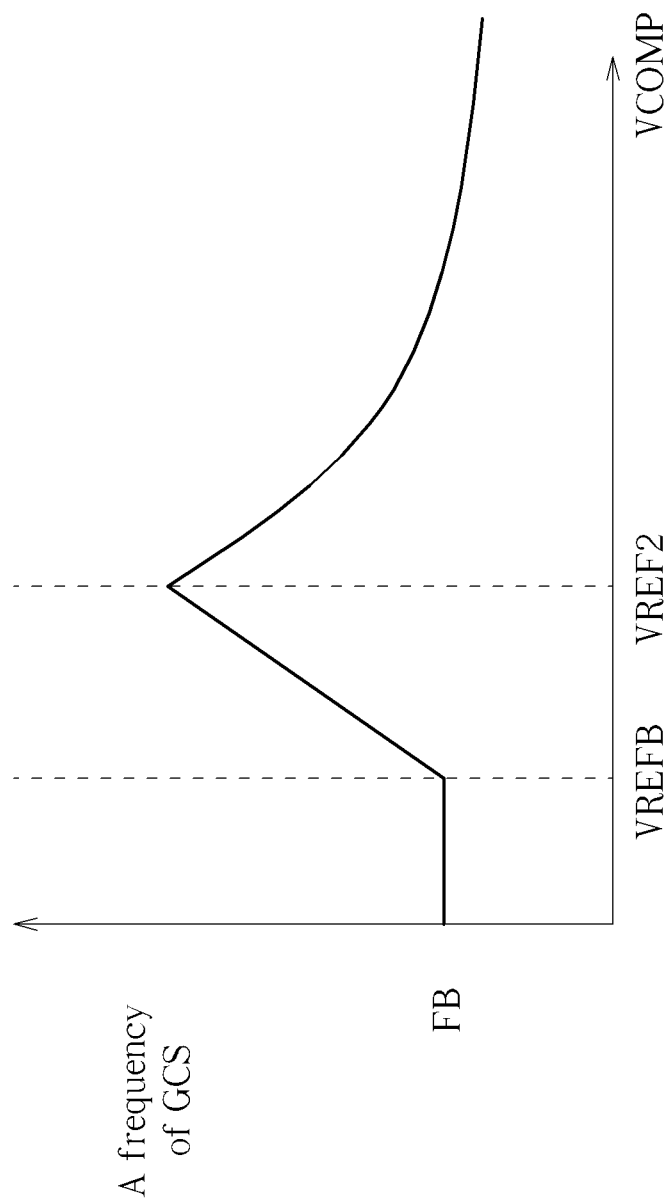
FIG. 4 is a diagram illustrating a relationship between a frequency of the gate control signal and the compensation voltage.

Please refer to FIG. 4. FIG. 4 is a diagram illustrating a relationship between a frequency of the gate control signal GCS and the compensation voltage VCOMP. As shown in FIG. 4, when the compensation voltage VCOMP is greater than the second reference voltage VREF2 (that is, the frequency limiting signal generator 208 does not generate the frequency limiting signal LS, and the power converter 100 enters the quasi resonant mode), the gate signal generator 210 generates the gate control signal GCS corresponding to the quasi resonant mode according to zero-crossing signal ZCS generated by the zero-crossing signal generator 204, and the gate control signal GCS can be transmitted to the power switch 104 of the power converter 100 through the gate pin 214; when the compensation voltage VCOMP is less than the second reference voltage VREF2 and greater than the burst mode reference voltage VREFB (that is, the frequency limiting signal generator 208 generates the frequency limiting signal LS, and the power converter 100 enters the touch current reduction mode), the gate signal generator 210 can generate the gate control signal GCS corresponding to the touch current reduction mode according to the zero-crossing signal ZCS and the frequency limiting signal LS, and the gate control signal GCS can be transmitted to the power switch 104 of the power converter 100 through the gate pin 214; when the compensation voltage VCOMP is less than the burst mode reference voltage VREFB (that is, the power converter 100 enters the burst mode), the gate signal generator 210 can generate the gate control signal GCS corresponding to the burst mode according to the burst mode signal BS and the zero-crossing signal ZCS, and the gate control signal GCS can be transmitted to the power switch 104 of the power converter 100 through the gate pin 214, where a frequency FB of the gate control signal GCS corresponding to the burst mode is adjustable. Therefore, as shown in FIG. 4, the frequency of the gate control signal GCS is varied with the compensation voltage VCOMP between the burst mode reference voltage VREFB and the second reference voltage VREF2. In addition, the second reference voltage VREF2 and the burst mode reference voltage VREFB are adjustable.

Figure 5A:
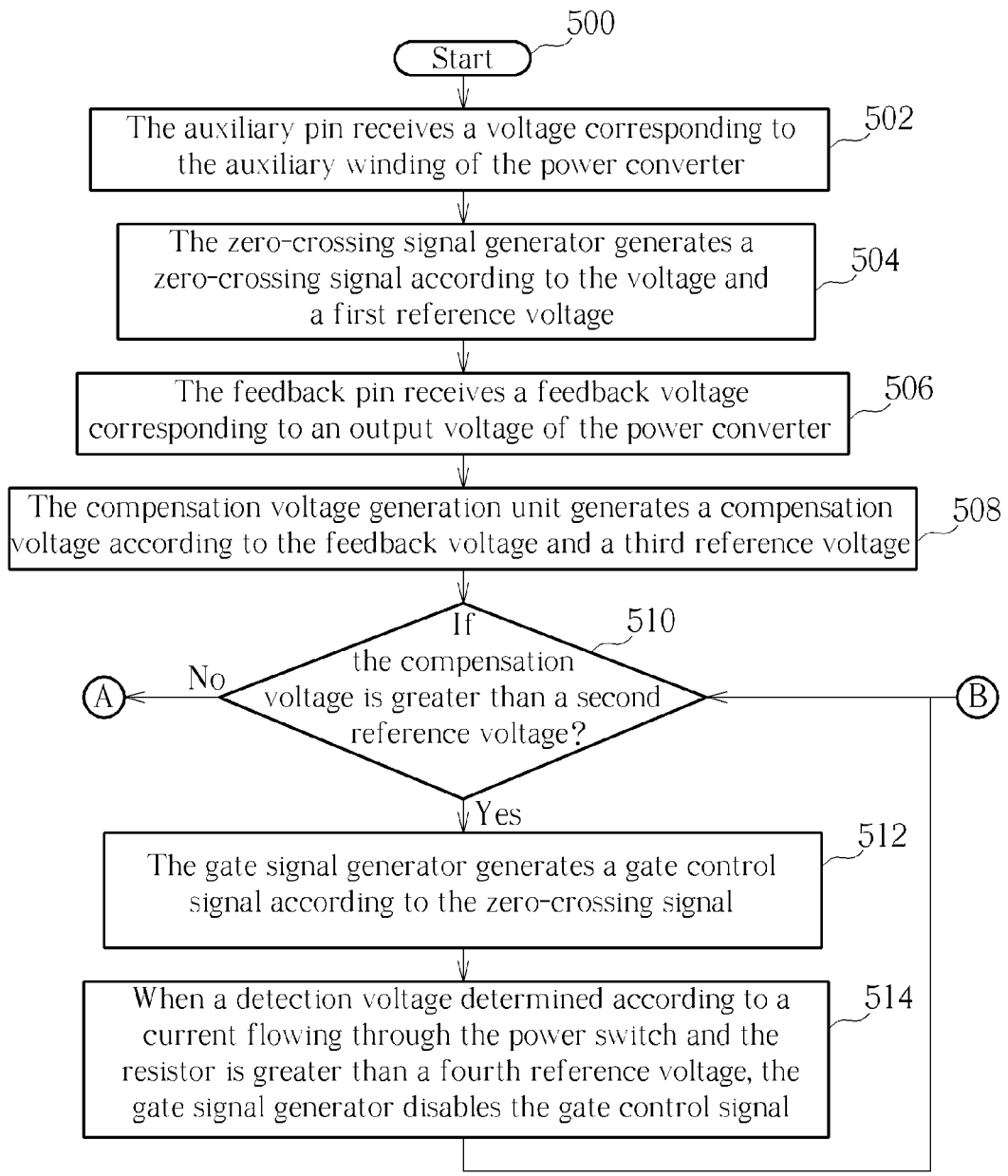
FIG. 5A and FIG. 5B are flowcharts illustrating an operation method for reducing touch current of a power converter according to another embodiment.
Figure 5B:
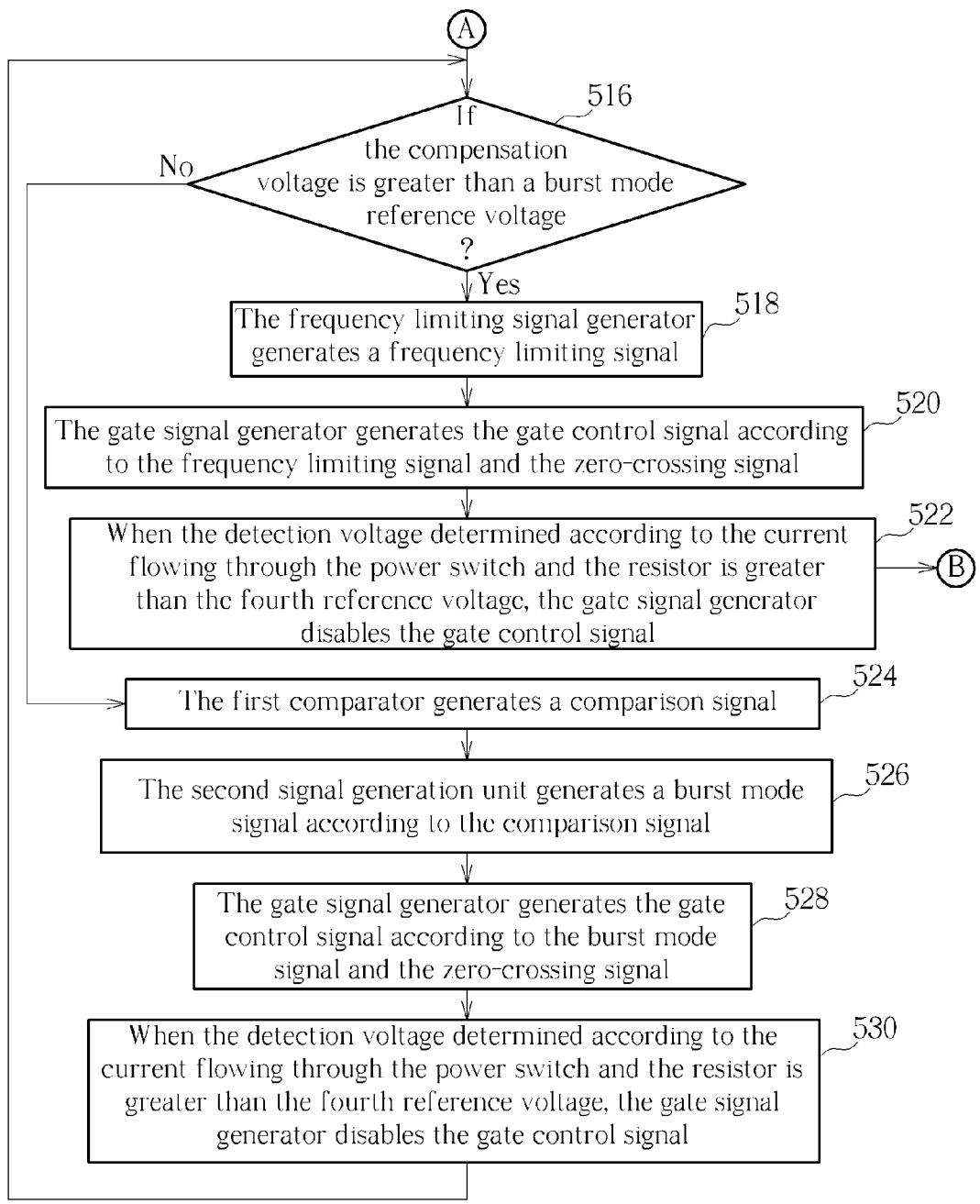

Please refer to FIG. 1, FIG. 2, FIG. 3, FIG. 4, FIG. 5A, and FIG. 5B. FIG. 5A and FIG. 5B are flowcharts illustrating an operation method for reducing touch current of a power converter according to another embodiment. The operation method in FIG. 5A and FIG. 5B are illustrated using the power converter 100 and the control circuit 200 in FIG. 1. Detailed steps are as follows:

Step 500: Start.

Step 502: The auxiliary pin 202 receives a voltage VD corresponding to the auxiliary winding AUX of the power converter 100.

Step 504: The zero-crossing signal generator 204 generates a zero-crossing signal ZCS according to the voltage VD and a first reference voltage VREF1.

Step 506: The feedback pin 206 receives a feedback voltage VFB corresponding to an output voltage VOUT of the power converter 100.

Step 508: The compensation voltage generation unit 2082 generates a compensation voltage VCOMP according to the feedback voltage VFB and a third reference voltage VREF3.

Step 510: If the compensation voltage VCOMP is greater than a second reference voltage VREF2; if yes, go to Step 512; if no, go to Step 516.

Step 512: The gate signal generator 210 generates a gate control signal GCS according to the zero-crossing signal ZCS.

Step 514: When a detection voltage DV determined according to a current IS flowing through the power switch 104 and the resistor 106 is greater than a fourth reference voltage VREF4, the gate signal generator 210 disables the gate control signal GCS; go to Step 510.

Step 516: If the compensation voltage VCOMP is greater than a burst mode reference voltage VREFB; if yes, go to Step 518; if no, go to Step 524.

Step 518: The frequency limiting signal generator 208 generates a frequency limiting signal LS.

Step 520: The gate signal generator 210 generates the gate control signal GCS according to the frequency limiting signal LS and the zero-crossing signal ZCS.

Step 522: When the detection voltage DV determined according to the current IS flowing through the power switch 104 and the resistor 106 is greater than the fourth reference voltage VREF4, the gate signal generator 210 disables the gate control signal GCS; go to Step 510.

Step 524: The first comparator 2122 generates a comparison signal CS.

Step 526: The second signal generation unit 2124 generates a burst mode signal BS according to the comparison signal CS.

Step 528: The gate signal generator 210 generates the gate control signal GCS according to the burst mode signal BS and the zero-crossing signal ZCS.

Step 530: When the detection voltage DV determined according to the current IS flowing through the power switch 104 and the resistor 106 is greater than the fourth reference voltage VREF4, the gate signal generator 210 disables the gate control signal GCS; go to Step 516.

As shown in FIG. 1, in Step 502, the auxiliary pin 202 receives the voltage VD corresponding to the auxiliary winding AUX, where the induction direction of the auxiliary winding AUX and the induction direction of the inductor 102 coupled to the power converter 100 are inverse each other. In Step 504, the zero-crossing signal generator 204 generates the zero-crossing signal ZCS according to the voltage VD and the first reference voltage VREF1, where the first reference voltage VREF1 is about 0.2V to 0.3V. That is to say, when the voltage VD is less than the first reference voltage VREF1, the zero-crossing signal generator 204 generates the zero-crossing signal ZCS. As shown in FIG. 1, the zero-crossing signal generator 204 is a hysteresis comparator. In Step 506, the feedback voltage VFB received by the feedback pin 206 corresponds to the load of the converter 100. That is to say, the feedback voltage VFB can be varied with the load of the power converter 100.

In Step 508, as shown in FIG. 1, the transconductance amplifier 20822 of the compensation voltage generation unit 2082 generates a first current I1 according to the feedback voltage VFB and the third reference voltage VREF3, and the first resistor 20824 and the first capacitor 20826 generates the compensation voltage VCOMP according to the first current I1. In Step 512, as shown in FIG. 1 and FIG. 3, when the compensation voltage VCOMP is greater than the second reference voltage VREF2 (that is, the frequency limiting signal generator 208 does not generate the frequency limiting signal LS, and the power converter 100 enters the quasi resonant mode), the gate signal generator 210 generates the gate control signal GCS corresponding to the quasi resonant mode (as shown in FIG. 4) according to the zero-crossing signal ZCS generated by the zero-crossing signal generator 204, and the gate control signal GCS can be transmitted to the power switch 104 of the power converter 100 through the gate pin 214. Then, the power switch 104 can be turned on according to the gate control signal GCS corresponding to the quasi resonant mode.

In Step 518, as shown in FIG. 1 and FIG. 2, when the compensation voltage VCOMP is less than the second reference voltage VREF2 and greater than the burst mode reference voltage VREFB, the first signal generation unit 2084 generates the frequency limiting signal LS to the gate signal generator 210. As shown in FIG. 2, when the gate signal generator 210 receives the zero-crossing signal ZCS and the frequency limiting signal LS, the gate signal generator 210 can generate the gate control signal GCS corresponding to the touch current reduction mode (as shown in FIG. 4) according to the zero-crossing signal ZCS and the frequency limiting signal LS, and the gate control signal GCS can be transmitted to the power switch 104 of the power converter 100 through the gate pin 214. Then, the power switch 104 can be turned on according to the gate control signal GCS corresponding to the touch current reduction mode.

In Step 524, as shown in FIG. 1, when the compensation voltage VCOMP is less than the burst mode reference voltage VREFB, the first comparator 2122 generates the comparison signal CS, where the burst mode reference voltage VREFB is less than the second reference voltage VREF2. In Step 526, as shown in FIG. 1, when the second signal generation unit 2124 receives the comparison signal CS, the second signal generation unit 2124 can generate the burst mode signal BS to the gate signal generator 210 (that is, the power converter 100 enters the burst mode) according to the comparison signal CS. In Step 528, as shown in FIG. 1, when the gate signal generator 210 receives the burst mode signal BS, the gate signal generator 210 can generate the gate control signal GCS corresponding to the burst mode (as shown in FIG. 4) according to the burst mode signal BS and the zero-crossing signal ZCS, and the gate control signal GCS can be transmitted to the power switch 104 of the power converter 100 through the gate pin 214, where a frequency FB of the gate control signal GCS corresponding to the burst mode is adjustable. Then, the power switch 104 can be turned on according to the gate control signal GCS corresponding to the burst mode.

Therefore, in Step 518 to Step 522, as shown in FIG. 4, the frequency of the gate control signal GCS is varied with the compensation voltage VCOMP between the burst mode reference voltage VREFB and the second reference voltage VREF2. In addition, the second reference voltage VREF2 and the burst mode reference voltage VREFB are adjustable.

In addition, in Step 514, Step 522, and Step 530, as shown in FIG. 1, the current pin 216 is used for receiving the detection voltage DV determined according to the current IS flowing through the power switch 104 and the resistor 106. The gate signal generator 210 is further used for disabling the gate control signal GCS according to the detection voltage DV and the fourth reference voltage VREF4. That is to say, when the detection voltage DV is greater than the fourth reference voltage VREF4, the gate signal generator 210 disables the gate control signal GCS to turn off the power switch 104.

To sum up, the control circuit for reducing touch current of a power converter and the operation method thereof utilize the frequency limiting signal generator to generate a frequency limiting signal according to a feedback voltage and a second reference voltage when the power converter leaves the burst mode to make a frequency of a gate control signal be varied with a compensation voltage between a burst mode reference voltage and the second reference voltage. When the frequency limiting signal generator does not generate the frequency limiting signal, the gate signal generator can generate the gate control signal corresponding to the quasi resonant mode according to a zero-crossing signal. Thus, compared to the prior art, because the frequencies of the gate control signals corresponding to two terminals of the touch current reduction mode are different, the present invention can slowly decrease a voltage of an input capacitor of the power converter to reduce the touch current when the power converter leaves the burst mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit for reducing touch current of a power converter, wherein the power converter is a power converter with power factor correction (PFC), the control circuit comprising:
    an auxiliary pin for receiving a voltage corresponding to an auxiliary winding of the power converter;
    a zero-crossing signal generator for generating a zero-crossing signal according to the voltage and a first reference voltage;
    a feedback pin for receiving a feedback voltage corresponding to an output voltage of the power converter;
    a frequency limiting signal generator for generating a frequency limiting signal according to the feedback voltage and a second reference voltage, wherein the frequency limiting signal generator comprises:
        a compensation voltage generation unit for generating a compensation voltage according to the feedback voltage and a third reference voltage; and
        a first signal generation unit for generating the frequency limiting signal when the compensation voltage is less than the second reference voltage;
    a gate signal generator for generating a gate control signal to a power switch of the power converter according to the zero-crossing signal and the frequency limiting signal; and
    a burst mode signal generation module, comprising:
        a first comparator for generating a comparison signal according to the compensation voltage and a burst mode reference voltage, wherein the burst mode reference voltage is less than the second reference voltage; and
        a second signal generation unit for generating a burst mode signal to the gate signal generator according to the comparison signal;
        wherein the gate signal generator is further used for generating the gate control signal to the power switch according to the burst mode signal and the zero-crossing signal, and a frequency of the gate control signal is varied with the compensation voltage between the burst mode reference voltage and the second reference voltage.

2. The control circuit of claim 1, further comprising:
    a current pin for receiving a detection voltage determined according to a current flowing through the power switch and a resistor;
    wherein the gate signal generator is further used for disabling the gate control signal according to the detection voltage and a fourth reference voltage.

3. The control circuit of claim 1, wherein the compensation voltage generation unit comprises:
    a transconductance amplifier for generating a first current according to the feedback voltage and the third reference voltage;
    a first resistor; and
    a first capacitor, wherein the first resistor and the first capacitor are used for generating the compensation voltage according to the first current.

4. The control circuit of claim 1, wherein the second reference voltage and the burst mode reference voltage are adjustable.

5. The control circuit of claim 1, further comprising:
    a current pin for receiving a detection voltage determined according to a current flowing through the power switch and a resistor;

wherein the gate signal generator is further used for disabling the gate control signal according to the detection voltage and a fourth reference voltage.

6. The control circuit of claim 1, wherein the gate signal generator is further used for generating the gate control signal to the power switch according to the zero-crossing signal when the compensation voltage is greater than the second reference voltage.

7. The control circuit of claim 1, further comprising:
a gate pin, wherein the gate control signal is transmitted to the power switch through the gate pin.

8. The control circuit of claim 7, further comprising:
a current pin for receiving a detection voltage determined according to a current flowing through the power switch and a resistor;
wherein the gate signal generator is further used for disabling the gate control signal according to the detection voltage and a fourth reference voltage.

9. The control circuit of claim 1, wherein the feedback voltage corresponds to a load of the power converter.

10. An operation method for reducing touch current of a power converter, the operation method comprising:
receiving a voltage corresponding to an auxiliary winding of the power converter;
generating a zero-crossing signal according to the voltage and a first reference voltage;
receiving a feedback voltage corresponding to an output voltage of the power converter;
generating a compensation voltage according to the feedback voltage and a third reference voltage; and
generating a gate control signal to a power switch of the power converter according to a combination composed of the zero-crossing signal, the compensation voltage, a second reference voltage, and a burst mode reference voltage;
wherein the burst mode reference voltage is less than the second reference voltage, and a frequency of the gate control signal is varied with the compensation voltage between the burst mode reference voltage and the second reference voltage.

11. The operation method of claim 10, wherein generating the gate control signal according to the combination composed of the zero-crossing signal, the compensation voltage, the second reference voltage, and the burst mode reference voltage comprises:
generating a frequency limiting signal when the compensation voltage is less than the second reference voltage and greater than the burst mode reference voltage; and
generating the gate control signal according to the zero-crossing signal and the frequency limiting signal.

12. The operation method of claim 11, further comprising:
receiving a detection voltage determined according to a current flowing through the power switch and a resistor; and
disabling the gate control signal according to the detection voltage and a fourth reference voltage.

13. The operation method of claim 10, wherein generating the gate control signal according to the combination composed of the zero-crossing signal, the compensation voltage, the second reference voltage, and the burst mode reference voltage comprises:
generating the gate control signal according to the zero-crossing signal when the compensation voltage is greater than the second reference voltage.

14. The operation method of claim 13, further comprising:
receiving a detection voltage determined according to a current flowing through the power switch and a resistor; and
disabling the gate control signal according to the detection voltage and a fourth reference voltage.

15. The operation method of claim 10, wherein generating the gate control signal according to the combination composed of the zero-crossing signal, the compensation voltage, the second reference voltage, and the burst mode reference voltage comprises:
generating a comparison signal when the compensation voltage is less than the burst mode reference voltage;
generating a burst mode signal according to the comparison signal; and
generating the gate control signal according to the burst mode signal and the zero-crossing signal.

16. The operation method of claim 15 wherein the second reference voltage and the burst mode reference voltage are adjustable.

17. The operation method of claim 15, further comprising:
receiving a detection voltage determined according to a current flowing through the power switch and a resistor; and
disabling the gate control signal according to the detection voltage and a fourth reference voltage.

18. The operation method of claim 10, wherein the feedback voltage corresponds to a load of the power converter.

* * * * *